July 18, 1950 — H. J. DYER — 2,515,202
GAS AND LIQUID SEPARATOR
Filed Nov. 6, 1944
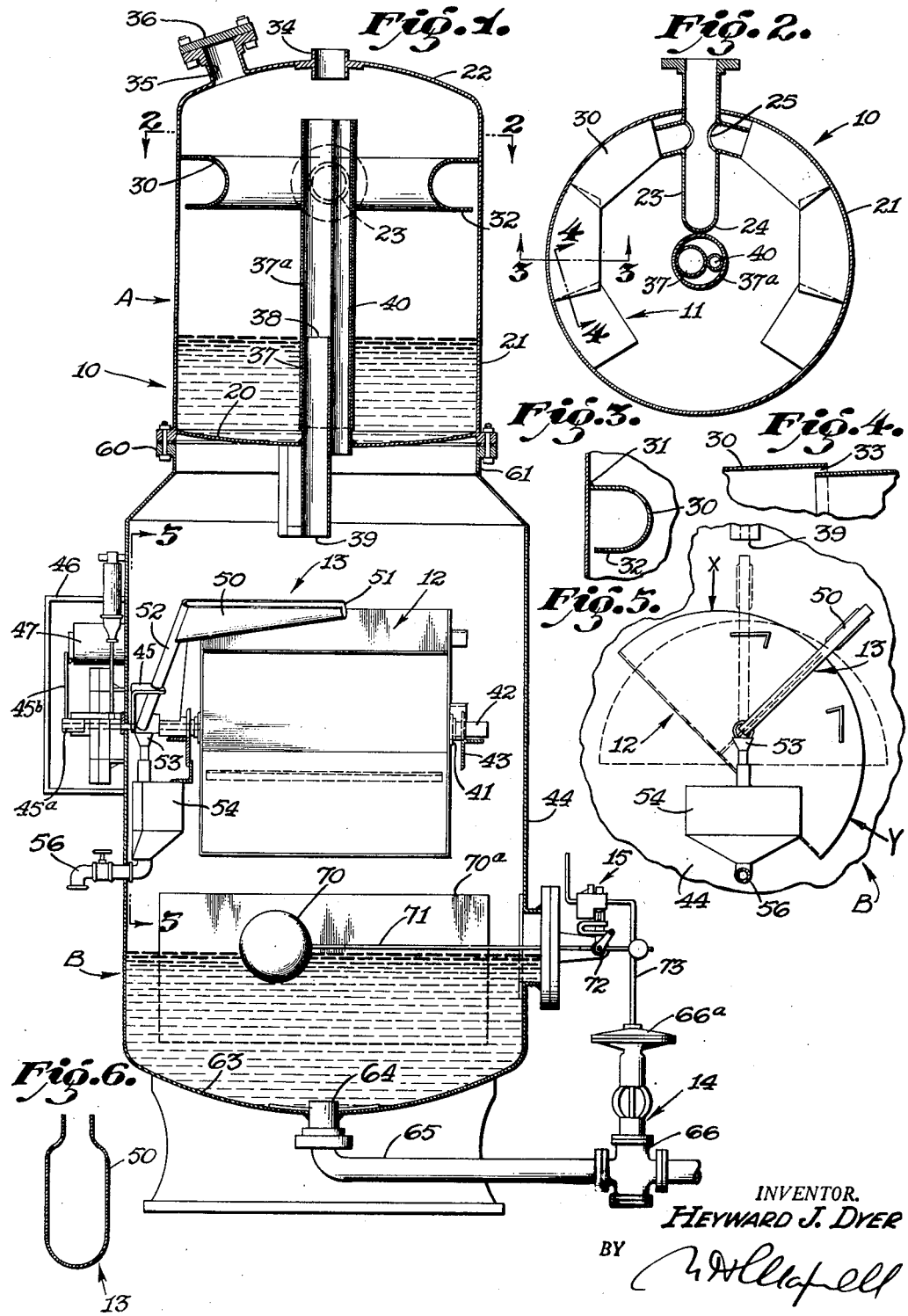
INVENTOR.
HEYWARD J. DYER
BY
ATTORNEY Patented July 18, 1950

2,515,202

UNITED STATES PATENT OFFICE 2,515,202

GAS AND LIQUID SEPARATOR

Heyward J. Dyer, Los Angeles, Calif.

Application November 6, 1944, Serial No. 562,204

2 Claims. (Cl. 183—2.7)

This invention has to do with a flow handling apparatus and it is a general object of the invention to provide a unit or apparatus effective for handling flow from an oil well to extract the liquids and measure them.

Many oil wells produce a mixture of liquids and gases requiring separation and it is generally required that the liquids at least be measured as they are produced. Since such flow from a well involves both gas and liquid it must be held or confined and in many instances the flow is under pressures that require heavy equipment to effectively handle them.

It is a general object of my invention to provide a unitary device or apparatus that will effectively and accurately separate liquid out of flow from a well, measure it and discharge it into a flow line. The device of the present invention is a completely enclosed unit constructed to effectively handle liquids and gases under pressure, if necessary, and which is operable to handle both liquids and fluids in a closed circuit or system.

A general object of my invention is to provide various improvements in the general formation, arrangement and construction of parts in apparatus of the general character referred to. By my present invention I provide a structure which is extremely simple and inexpensive of manufacture yet effective and accurate in operation. By my invention I provide a very simple yet effective means of separating liquids and gases and for delivering the separated liquids to a simple, dependable measuring device.

The various objects and features of my invention will be fully understood from the following detailed description of a typical preferred form and application of the invention, throughout which description reference is made to the accompanying drawings, in which:

Fig. 1 is a vertical detailed sectional view of the apparatus provided by my invention showing the various essential elements thereof and illustrating the general construction and relationship. Fig. 2 is a detailed plan section taken as indicated by line 2—2 on Fig. 1. Fig. 3 is a detailed sectional view taken as indicated by line 3—3 on Fig. 2. Fig. 4 is a detailed sectional view taken as indicated by line 4—4 on Fig. 2. Fig. 5 is a view taken substantially as indicated by line 5—5 on Fig. 1 showing the dump bucket of the measuring device in a central or mid position through which it passes in moving from one extreme position to the other, and Fig. 6 is an enlarged detailed section of the trough which catches samples of the oil.

The apparatus provided by my invention involves, generally, an elongate vertically disposed body 10 forming a case or shell in which the various working parts of the mechanism are enclosed, baffle means 11 to aid in separating liquids and gases, a measuring apparatus 12 operable to measure liquids, a sampling device 13 in combination with the measuring apparatus, a valve controlled outlet means 14, and a control 15 for the outlet means.

The body 10, which is the principal or basic element of the apparatus, is a vertically disposed tank-like structure divided intermediate its length by means of a partition 20 into an upper section A and a lower section B. The baffle means 11 is carried within the upper section A of the body 10 while the other elements hereinabove referred to are arranged in or in connection with the lower section B.

The upper section A of the body 10 includes a cylindrical side wall 21 which projects upwardly from the partition 20 and a top 22 which closes the upper end of the side wall. A flow inlet 23 extends into the upper section A near its upper end by extending through an opening in the side wall 21. The flow inlet 23 may be in the form of a pipe having its outer end portion flanged or otherwise fitted for connection with a line from the well and having its inner end, which is near the center or middle portion of the upper section A, closed by an end wall 24 so that the flow inlet acts as a bull plug. Discharge openings 25 are provided in opposite sides of the inlet 23 immediately inside the side wall 21 so that flow from the well passes through the openings 25 and discharges horizontally into the baffle means 11.

The baffle means 11 is divided into two parts, one handling the flow from each of the openings 25. Each part or section of the baffle means includes a plurality of baffle plates 30 arranged end to end with their end portions somewhat overlapped and extending around the inner wall of the side 21 from the point of receiving flow from the flow inlet 23. Each plate 30 is curved or shell-like in cross section and has its upper edge portion fixed to the wall of the side 21 as by welding 31, and has its lower edge 32 spaced somewhat from the inner wall of the side 21 forming a downwardly opening passage through which material discharged through the openings 25 can drain into the lower portion of the section A. Where the ends of the plates 30 adjoin or overlap it is preferred that they be spaced somewhat apart, as shown in Fig. 4, to form outlet passages 33 which serve to allow free escape of gas into the upper end portion of the section A. In practice the particular formation and arrangement of plates 30 may be varied as circumstances require. However, for most uses I have found that six plates 30 arranged substantially as shown in Figs. 1 and 2 of the drawings work satisfactorily under average conditions.

A gas outlet connection 34 is provided in the center of the top 22 and a service opening 35 normally closed by a cover plate 36 may be provided in the top 22 as illustrated in the drawings.

It is to be understood that a gas delivery line, or the like, may be attached to connection 34.

In accordance with my invention a stand pipe 37 extends through the center portion of the partition 20 and has its upper end 38 open and terminating at a point in the body section A well above the bottom or partition 20, and has its lower end 39 open and terminating in the lower section B immediately above the zone through which the sampler 13 operates as will be hereinafter described.

The stand pipe 37 is fixed in or to the partition 20 and forms a fluid connection between the upper and lower sections of the apparatus. A tubular shield 37ª surrounds the stand pipe 37 and extends down from a point near the top of section A over the stand pipe 37 to a point immediately above the partition 20. Because of the shield, liquid or foam in section A cannot flow directly into pipe 37, but must first accumulate in the bottom of section A and then pass into the lower end of the shield and flow up in the shield before entering the top 38 of pipe 37 to flow by gravity into the lower section B. The result of this handling of the fluid is that it is free of foam as it enters the lower section B.

A safety or overflow pipe 40 is provided in the section A. The pipe 40 extends through an opening in the partition 20 so that its lower end opens into the lower section B while its upper end extends into the upper end portion of the section A where it is open to receive liquids that might otherwise flood the apparatus. Pipe 40 is preferably located within shield 37ª. The pipe 40 also serves as a pressure equalizer to normally maintain equal pressure in the two sections A and B of the apparatus.

In accordance with my invention the liquid measuring device 12 provided in the section B is of the dump bucket type, that is, it involves, generally, a dump bucket formed to have two compartments X and Y, the bucket being provided with supporting trunnions 41 carried in bearings 42 suitably located in the lower section B of the body. The bearings may be supported on suitable frame members 43 supported from the cylindrical side wall 44 of the lower section B of the body.

There is a housing 46 on the exterior of the side wall carrying a suitable counter 47 which is operatively connected with the dump bucket by a pivoted forked lever 45. The forked lever 45 which straddles a part moving with the dump bucket to be oscillated with the bucket is carried on a shaft 45ª which is operatively coupled with the counter by suitable linkage 45ᵇ.

The dump bucket is of a form and construction common to this type of measuring device and operates between two positions, one where the compartment X is up to receive fluid from the pipe 37 and the other where the compartment Y is up to receive fluid from the pipe 37. The bucket is such that when a given quantity of fluid has filled into either of the compartments the bucket dumps or turns to the other position discharging the filled compartment into the lower portion of the body section B. Since dump bucket type measuring devices are old and are well known in the art I have not illustrated all the details of this part of the apparatus, it being understood that any details or features of construction suitable for such element can be incorporated in the construction.

The sampler 13 includes a trough 50 carried by the oscillating bucket of the means 12 which trough has an open mouth 51 which passes under the pipe 37 each time the bucket moves from one position to the other. The mouth opening 51 may be narrow so that only a small amount of liquid is caught each time the bucket moves. A discharge spout 52 extends from the trough 50 to a point near the axis of the dump bucket and there discharges into a funnel 53 which delivers the trapped or sampled fluid into a container 54 from which it can be drawn through a valve controlled outlet connection 56 at the exterior of the apparatus.

The lower section B of the body 10 includes the cylindrical side wall 44 hereinabove described, the upper end of which is suitably joined to the lower end of the side wall 21 of the upper section A. In the construction illustrated these two elements are joined by a suitable flange connection 60 which occurs at the point where the partition 20 is located. In the particular design illustrated the side wall 44 of the lower section B is somewhat larger in diameter than the side wall 21 of the upper section A and the wall 44 has a restricted or reduced upper end portion 61 immediately below the flange connection. The lower end of the section B is closed by a bottom 63 provided with an outlet opening 64.

The outlet means 14 provided by my invention includes an outlet or drain pipe 65 fitted with a suitable control valve 66. The control 15 provided by my invention serves to control the valve 66 in order to maintain a suitable level of liquid in the lower end portion of the body section B. The control, as illustrated in the drawings, includes a float 70 in the section B carried in an arm 71 which is operatively connected with a suitable pilot means 72, the pilot being connected with the control diaphragm 66ª of the valve 66 through a suitable pressure connection 73. The float may be guided by or between a pair of guide plates 70ª. Through the valve 66 and the control means 15 a substantially constant level of liquid is maintained in the lower end portion of the section B of the body 10.

From the foregoing description it will be apparent that as flow from a well enters the device through the flow inlet 23 it is divided into two streams flowing in opposite directions around the inner side of wall 21 under or within the plates 30. At this point in the apparatus I obtain an effective separation of gas and liquids, the gases being allowed to flow up and into the upper end of the section A to discharge through the outlet 34 and the liquids being allowed to flow down and into the lower end portion of the section A. The liquids accumulating in the lower end portion of the section A pass up through shield 37ª and overflow through the pipe 37 and fill into the dump bucket until it is overbalanced to operate from one of its positions to the other. As the flow continues through the pipe 37 the dump bucket again fills and when a given quantity has filled into the second or said other compartment of the bucket the bucket swings back to the original position. As the flow continues in the device the bucket oscillates measuring the quantity of liquid, all of which is indicated by the counter 47. As the liquid is dumped by the measuring device into the bottom of the section B it establishes or adds to the body of liquid in the lower end portion of the section B and acts on the float 70 so that the control 15 regulates the valve 66. The parts are designed and related so that there is always a body of liquid maintained in the bottom portion of the section B with the result that the apparatus will operate under pressure, if desired, or if the flow from the well is under pressure. To operate under pressure a flow line, or the like, for the gas is attached to connection 34.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. Apparatus of the character described including, a vertically disposed body closed at its upper end and having a transverse part defining a separator chamber in the body, said part forming the bottom of the chamber, gas and liquid separating means in the chamber including a series of like baffle plates extending around the interior of the body, the ends of adjoining plates being overlapped and spaced apart, each plate being curved in cross section and having its upper edge joined to the inner wall of the body and having its lower edge free, facing the inner wall of the body and spaced therefrom, an inlet duct conducting flow into the body and discharging into the separating means intermediate the ends of the series of plates, means conducting liquids through the bottom of the chamber, and means conducting gas from the top of the chamber.

2. Apparatus of the character described including, a vertically disposed cylindrical body closed at its ends, a flow inlet duct entering the side of the body and discharging horizontally in opposite directions at the inner wall of the body, gas and liquid separating means in the body receiving flow from the inlet duct and including a series of baffle plates extending horizontally in opposite directions from the inlet duct and around the inner wall of the body, the adjoining ends of said plates being overlapped and spaced apart and each plate being curved in cross section and having its upper edge joined throughout its length to the inner wall of the body and its lower edge free and facing the inner wall of the body and spaced therefrom, means conducting liquids from the body and a gas outlet means at the top of the body.

HEYWARD J. DYER.

REFERENCES CITED

The following references are of record in the file of this patent:

UNITED STATES PATENTS

| Number | Name | Date |
| --- | --- | --- |
| 879,141 | Bramley-Moore | Feb. 18, 1908 |
| 990,028 | Alger | Apr. 18, 1911 |
| 1,104,688 | Mason | July 21, 1914 |
| 1,151,290 | Sampson | Aug. 24, 1915 |
| 1,533,744 | Lorraine | Apr. 14, 1925 |
| 1,546,200 | Cavins | July 14, 1925 |
| 1,554,471 | Trumble | Sept. 22, 1925 |
| 1,571,201 | Jefferies | Feb. 2, 1926 |
| 1,581,371 | Weisgerber | Apr. 20, 1926 |
| 1,674,699 | Overstrom | June 26, 1928 |
| 1,777,806 | Nichols | Oct. 7, 1930 |
| 1,798,788 | Dyer | Mar. 31, 1931 |
| 1,860,896 | McGraw et al. | May 31, 1932 |
| 1,887,111 | Adams | Nov. 8, 1932 |
| 2,105,262 | Price | Jan. 11, 1938 |
| 2,158,381 | Raymond | May 16, 1939 |
| 2,181,686 | Walker | Nov. 28, 1939 |
| 2,297,297 | Walker | Sept. 29, 1942 |
| 2,358,629 | Delancey | Sept. 19, 1944 |